J. G. AYERS, Jr.
DEVICE FOR DETERMINING DIAMETERS.
APPLICATION FILED DEC. 3, 1909.
979,248.
Patented Dec. 20, 1910.
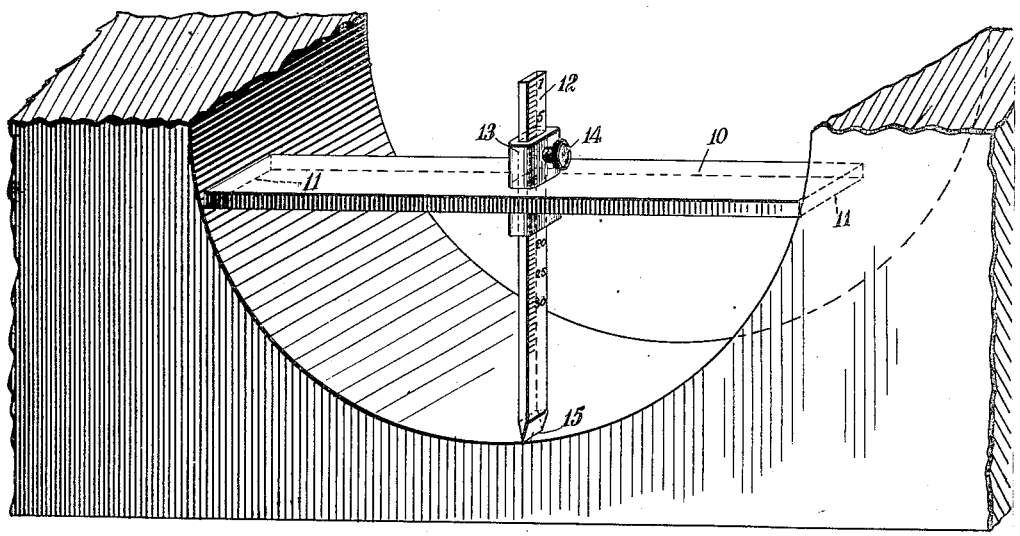
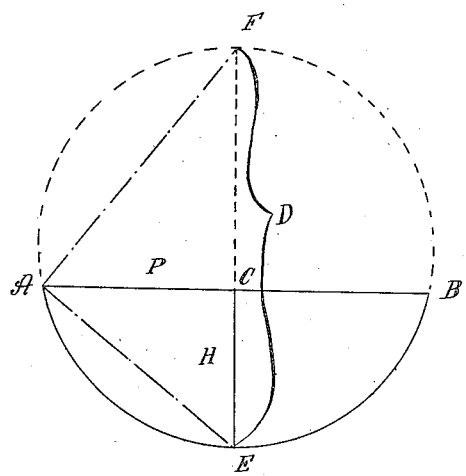
WITNESSES:
INVENTOR
Joseph G. Ayers Jr.
BY
ATTORNEYS

UNITED STATES PATENT OFFICE.

JOSEPH GERRISH AYERS, JR., OF STEELTON, PENNSYLVANIA.

DEVICE FOR DETERMINING DIAMETERS.

979,248.

Specification of Letters Patent. Patented Dec. 20, 1910.

Application filed December 3, 1909. Serial No. 531,238.

*To all whom it may concern:*

Be it known that I, JOSEPH G. AYERS, Jr., a citizen of the United States, and a resident of Steelton, in the county of Dauphin and State of Pennsylvania, have invented a new and Improved Device for Determining Diameters, of which the following is a full, clear, and exact description.

This invention relates to certain improvements in measuring devices, and the object of the invention is to provide a device whereby the diameter of a cylindrical bore or the radius of a curved surface, may be readily ascertained.

It is a comparatively easy matter to ascertain the diameter of a circle when the circle is complete, and various different forms of devices may be employed for accomplishing the purpose, but my improved device is especially designed for ascertaining the radius or diameter of a curve when only an arc of the curve is present or intact.

The invention is particularly useful for determining the diameter of an engine cylinder when only a portion of the whole of the cylinder is available, or for determining the diameter of a sewer pipe or conduit, or of a journal box from a fragment or section which presents only a portion of the complete cylindrical surface.

My improved device is extremely simple in construction, and embodies only two essential elements with means for holding them in fixed relationship. One of these elements or members is designed to have its ends engage with different portions of the cylindrical surface, so that the member extends along a chord of the cylinder and the other member is carried by the first member and is movable in respect thereto, to engage with a third point on the surface. The relative positions of the two members, when said members are in proper position, are directly dependent upon the diameter of the cylinder or bore, and, in fact determine the diameter.

The invention may assume various different forms as far as the details of construction are concerned, but a simple and efficient form is that illustrated in the drawings and described more in detail hereinafter.

Reference is to be had to the accompanying drawings, forming a part of this specification, in which similar characters of reference indicate corresponding parts in both the figures, and in which—

Figure 1 is a perspective view of a device constructed in accordance with my invention, and in operative position in respect to a body presenting a portion of a cylindrical surface; and Fig. 2 is a diagram showing the relationship of the parts within the portion of the cylinder, the complete circle being shown in dotted outline.

In its preferred form, my improved device includes a bar or plate 10, preferably of steel and of sufficient thickness to normally remain rigid with its edges straight and true. The form of the side edges of the bar or plate is immaterial, but the ends of the bar or plate present straight edges 11, parallel to each other and at right angles to the general direction of the bar. The bar may be made in various lengths dependent upon the character of the work to be measured, and is of such length that it may be inserted within the cylinder and may lie along a chord of the circle. The two end edges 11 are adapted to engage directly with the curved surface, and constitute elements of said surface. The edges 11 may be of any length desired, but they are preferably of such length that they will insure the holding of the bar 10 with its upper surface in a plane parallel to the axis of the circle, and with the edges 11 parallel to the axis, irrespective of any slight defects or irregularities in the portion of the surface with which said edges engage. The bar 10 carries a second bar 12, mounted exactly half-way between the ends of the bar 10, and disposed at right angles to said bar. For guiding the bar 12 and holding it against twisting or turning movement, the bar 10 preferably carries a guiding sleeve 13, which is rigidly secured to said bar 10 and has an aperture lengthwise thereof, through which the bar 12 may slide. The sleeve at one side thereof, may carry a set screw 14, by means of which the bar 12 may be locked in position in respect to the bar 10. The bar 12 may be of any desired form in cross section, but it is preferably non-cylindrical in cross section, so that it cannot rotate within the tube or sleeve 13, and the lower edge of the bar 12 preferably terminates in a sharp edge 15, extending parallel to the two edges 11. This edge 15 is of sufficient length, so that it will not enter into any very slight irregularities or cavities in the surface.

In using my improved device, the bar 10 is placed with its opposite ends in engagement with the curved surface to be measured, and the bar is so placed that it will extend across a portion of the curve and constitute a chord thereof. The forming of the ends with parallel edges 11, insures the median line of the bar 10 occupying a position in a plane at right angles to the axis of the bore or cylinder. The bar 12 is then permitted to drop until its lower edge 15 rests on the curved surface. The three edges 11, 11 and 15 thus engage with three elements of the cylindrical surface. As three points determine a circle, so each three elements determine a cylindrical surface, and therefore there can be but one true cylinder for each adjustment of the bar 12 in respect to the bar 10. The bar 12 is preferably calibrated, to give directly the diameter of the cylinder surface when the bars or members 10 and 12 are in proper position.

The calibration on the bar 12 may be obtained by the use of the formula $$D = \frac{P^2}{H} + H.$$

Considering the diagram shown in Fig. 2, the bar 10 may be represented by the line A B, and the bar 12 by the line C E. The diameter of the circle would be E F. The line A C, which represents one-half the length of the bar 10, is at right angles to the line E F, which represents the diameter of the circle. The line A C is the mean proportional between the sections E C and C F of the diameter, and therefore the diameter E F is equal to $$\frac{A C^2}{E C} + E C.$$

To simplify the formula, the line E F or diameter may be called D; the line E C, which represents the height of the chord, may be called the letter H, and the line A C, which represents one-half the chord, the letter P. Thus $$D = \frac{P^2}{H} + H.$$

With P constant, various values may be assigned to H, and various results secured for D. Instead of directly calibrating the bar 12 to read in diameter, it may, of course, be calibrated to read in exact length, and the formula may be used in figuring the diameter of a circle.

It is evident that the scale on the bar 12 should increase toward the lower end 15.

The minimum reading will be at the upper edge of the collar 13 when the length of the portion of the bar 12 below the bar 10 is equal to one-half the length of the bar 10. The bar 10 would then lie along a diameter of the circle. The greater the diameter of the circle, the shorter will be the portion of the bar 12 below the bar 10.

My improved device is especially designed for ascertaining the diameter when only a portion of the circumference is present, or in such condition that it may be measured from, but it is of course evident that the device may be used equally well when the whole cylindrical surface is intact. Upon placing the device in engagement with the cylindrical surface, it automatically assumes the proper position in respect thereto. The edges 11 insure the proper positioning of the bar 10, and the bar 12 will slide down until it engages with the surface. It is merely necessary to place the device in position, be sure that it rests steady, and then tighten the screw 14, after which the device may be removed and the reading taken.

Instead of marking the subdivisions on the bar 12 to indicate the different diameters or radii, I may, if desired, and in fact, I preferably divide the bar 12 into hundredths of an inch, and provide on the bar 10, a table or list showing the different radii or different diameters corresponding to each graduation on the bar 12. This permits the graduations or subdivisions on the bar 12 to be of uniform distance apart, and simplifies the marking. Furthermore, it permits the bar 12 to be removed and used for direct measuring of short distances.

Having thus described my invention, I claim as new and desire to secure by Letters Patent:

A device for determining diameters, comprising a bar adapted to lie within a chord of a cylinder and having straight edges at its ends for engaging with elements of the cylindrical surface, and a second bar carried by the first-mentioned bar at right angles thereto and intermediate its ends, said second-mentioned bar being longitudinally movable and having one end presenting a straight edge for engagement with the cylindrical surface along a third element thereof, and being calibrated to indicate the diameter of the cylinder when the three edges are in engagement with the cylindrical surface, and means for locking said bars against relative movement.

In testimony whereof I have signed my name to this specification in the presence of two subscribing witnesses.

JOSEPH GERRISH AYERS, Jr.

Witnesses:
 WALTON BOUTELLE FULLER,
 PAUL THOMAS LESHER.